H. M. P. MURPHY.
AIR BRAKE APPARATUS.
APPLICATION FILED MAR. 2, 1908.
912,973.
Patented Feb. 16, 1909.
3 SHEETS—SHEET 1.
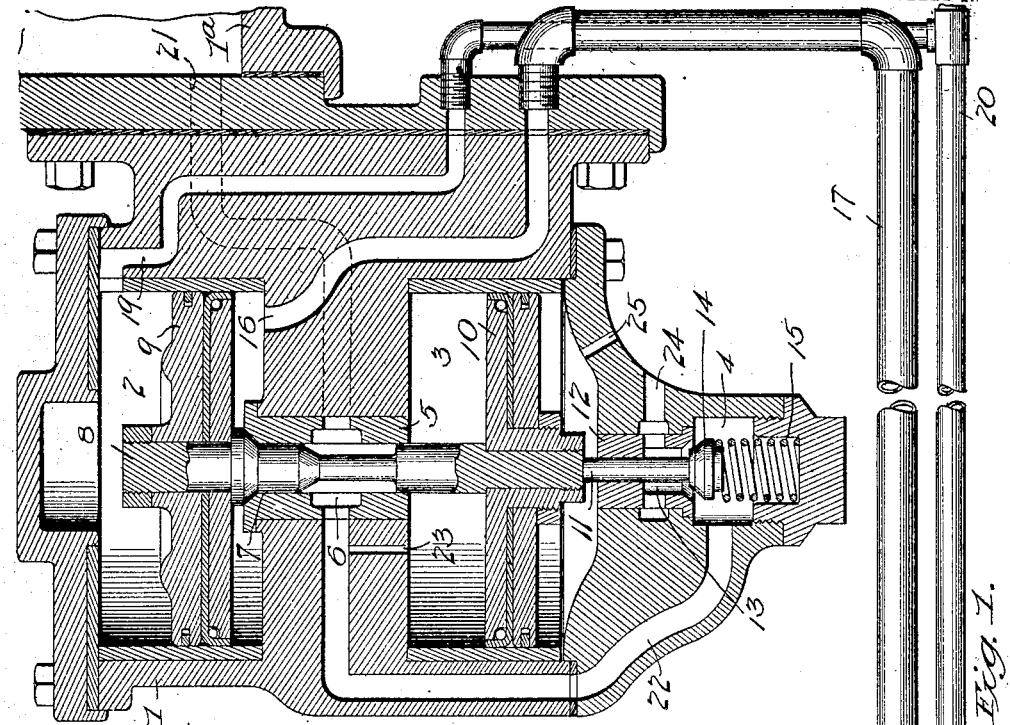
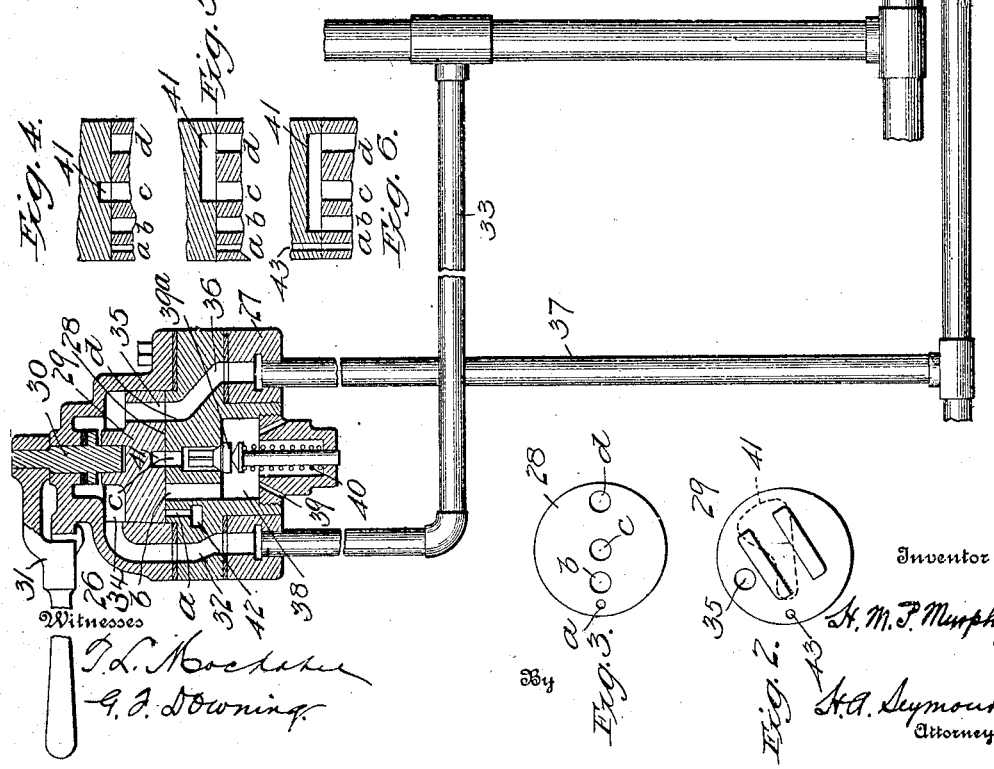
Witnesses
Inventor
H. M. P. Murphy
Attorney H. M. P. MURPHY.
AIR BRAKE APPARATUS.
APPLICATION FILED MAR. 2, 1908.
912,973.
Patented Feb. 16, 1909.
3 SHEETS—SHEET 2.
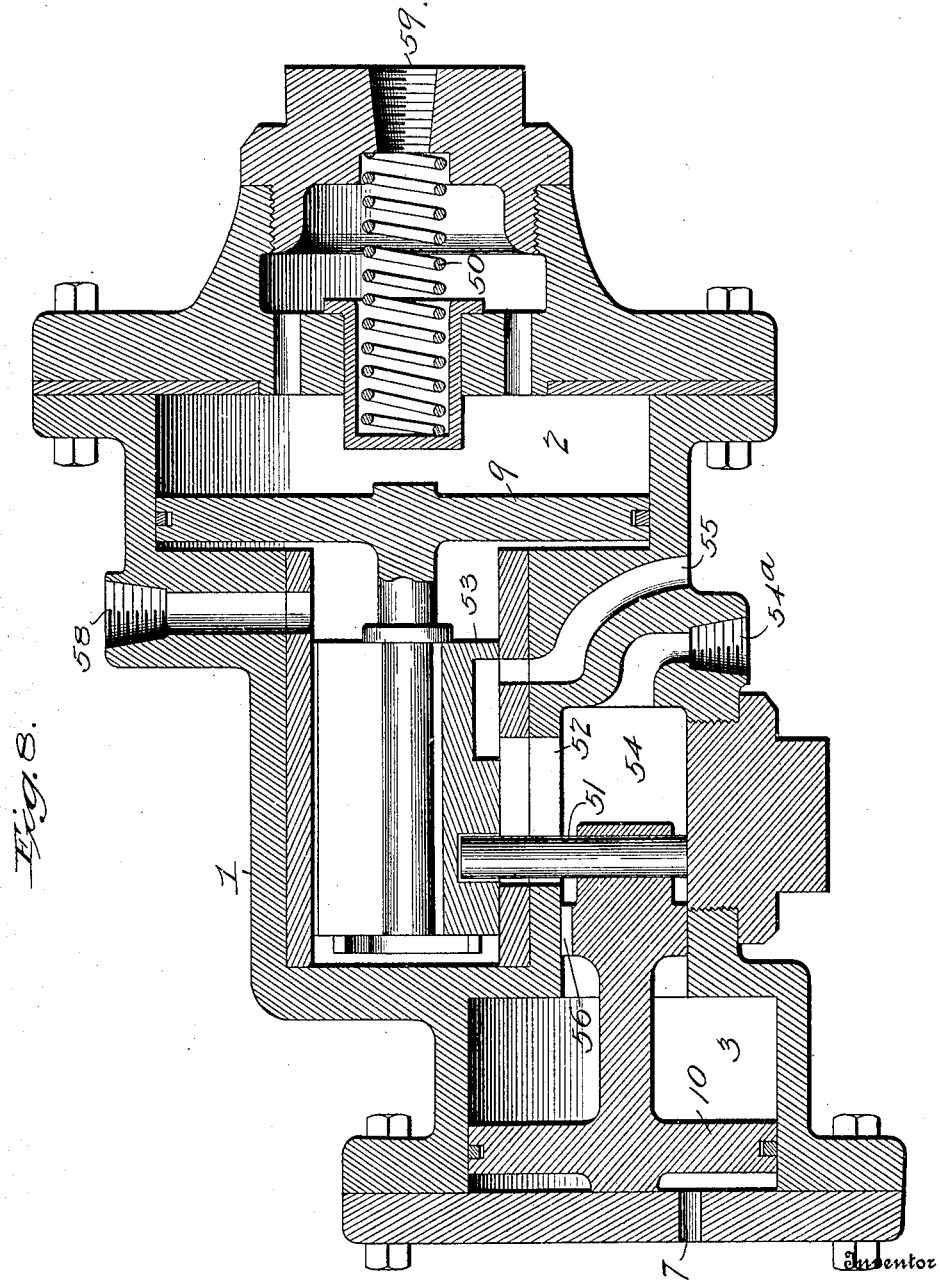

H. M. P. MURPHY.
AIR BRAKE APPARATUS.
APPLICATION FILED MAR. 2, 1908.
912,973.
Patented Feb. 16, 1909.
3 SHEETS—SHEET 3.
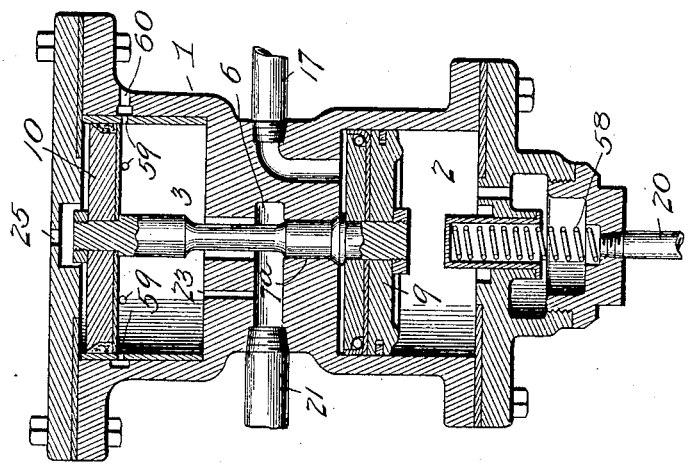
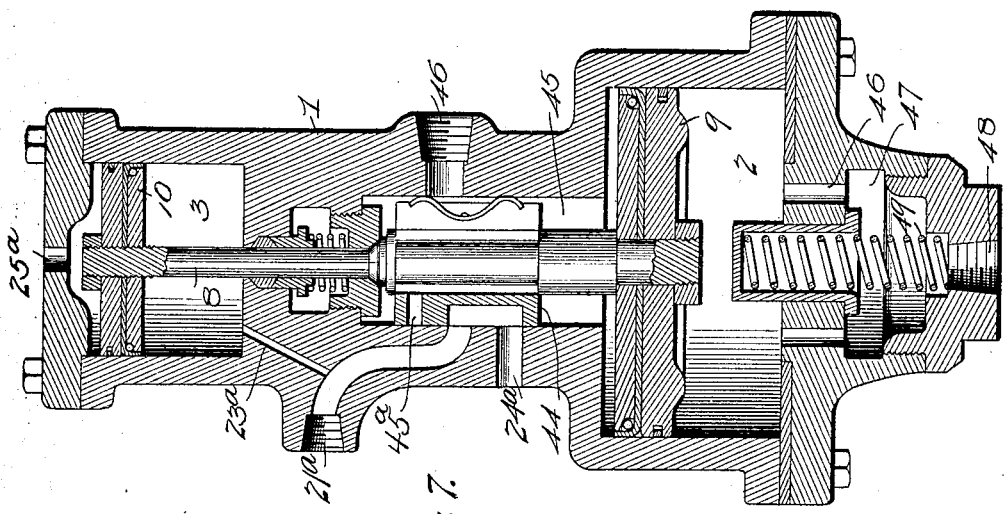

UNITED STATES PATENT OFFICE.

HOWARD M. P. MURPHY, OF PITTSBURG, PENNSYLVANIA, ASSIGNOR OF ONE-FOURTH TO LEE H. BOWMAN, OF MUNHALL, PENNSYLVANIA, AND ONE-EIGHTH TO JOSEPH M. FLANNERY, OF PITTSBURG, PENNSYLVANIA.

AIR-BRAKE APPARATUS.

No. 912,973.　　　　Specification of Letters Patent.　　　Patented Feb. 16, 1909.

Application filed March 2, 1908. Serial No. 418,864.

*To all whom it may concern:*

Be it known that I, HOWARD M. P. MURPHY, a resident of Pittsburg, in the county of Allegheny and State of Pennsylvania, have invented certain new and useful Improvements in Air-Brake Apparatus; and I do hereby declare the following to be a full, clear, and exact description of the invention, such as will enable others skilled in the art to which it appertains to make and use the same.

This invention relates to improvements in air brake apparatus, and more particularly to improved means for controlling the operation of the brakes,—the object of the invention being to provide a simple valve mechanism capable of operating accurately to apply, release, hold and maintain any desired amount of pressure in the brake cylinder, said valve mechanism acting in response to variations of pressure in a controlling chamber, said variations in pressure being under the control of the operator with the use of a manually operated valve which may be so constructed that a higher brake cylinder pressure can be obtained in cases of emergency than is necessary in the average service operation.

A further object is to so construct the mechanism that a definite pressure can be maintained in the brake cylinder for any desired length of time, notwithstanding any leakage which might occur from the brake cylinder.

With these objects in view, the invention consists in certain novel features of construction and combinations of parts as hereinafter set forth and pointed out in the claims.

In the accompanying drawings, Figure 1 is a sectional view, partly in elevation, illustrating my improvements; Fig. 2 is a top view of the rotary hand operated controlling valve. Fig. 3 is a top view of the seat for said rotary valve. Figs. 4, 5 and 6 are sectional views illustrating the different positions of said controlling valve, and Figs. 7, 8 and 9 are views illustrating modifications.

1 represents a valve casing secured by suitable means to the head of a brake cylinder 1ª. This casing is provided in its upper portion with a main or controlling chamber 2; in its intermediate portion with a chamber 3 and in its lower portion with a chamber 4. A sleeve or bushing 5 passes through an opening in the division wall between the chambers 2 and 3 and is provided between its ends with an annular chamber 6. A seat is provided at the upper end of the sleeve or bushing 5 for a valve 7 on a rod 8 which passes through said sleeve, terminating at its upper end within the chamber 2 and extending downwardly through the chamber 3. A piston 9 located within the chamber 2, is secured to the upper portion of the rod 8 and to the lower portion of said rod, within the chamber 3, a piston 10 is secured. A stem 11 in line with but disconnected from the rod 8, passes through a sleeve or bushing 12 which extends from the chamber 3 to the chamber 4. The lower portion of the sleeve 12 is made with a small internal chamber 13, the lower end of which is adapted to be closed by a valve 14 fixed to the lower end of the stem 11, and a spring 15 tends to press this valve toward its seat.

A duct 16 communicates at its upper end with the main or controlling chamber 2 below the piston 9 therein and at its other end, this duct receives fluid from a pipe 17, the latter being connected with a suitable source of supply, such as a main air reservoir, and this connection of the pipe 17 with the air reservoir or other source of supply may, if desired, be made through the medium of a suitable reducing valve mechanism.

A duct 19 communicates at one end with the upper portion of the chamber 2 above the piston 9 and at its other end, this duct is adapted to communicate with a pipe 20 which closely resembles in its functions, the "brake pipe" or "train line pipe" of air brake systems now in use.

A duct 21 communicates at one end with the brake cylinder 1ª and at its other end with the small chamber 6 in the sleeve or bushing 5, said chamber 6 being also connected, through the medium of a duct 22 with the chamber 4 at the lower end of the casing. From the duct 22, a short duct or passage 23 extends to the chamber 3 above the piston 10 therein. A duct 24, open to the atmosphere communicates with the chamber 13 in the sleeve or bushing 12, and a duct 25, open at one end, communicates at its other end with the chamber 3 below the piston 10 therein.

It is apparent that when the parts are in the positions shown in the drawings, air can escape from the brake cylinder through the ducts 21 and 22 to the chamber 4 and from the latter (the valve 14 being open) through the chamber 13 in bushing 12 and the duct 24 to the atmosphere. It is also readily to be seen that when the valve 14 is closed and the valve 7 open, fluid under pressure, entering the chamber 2, by the duct 16 and pipe 17, will flow from said chamber 2 to the small chamber 6 and from the latter, through the duct 21 to the brake cylinder 1ª.

Now it will be observed that the mechanism comprises two pistons rigidly connected together so that they must always move in unison, and valves so arranged that being controlled by the movements of the pistons, they provide means for admitting fluid to and exhausting it from the brake cylinders,—one of the pistons being exposed (on the side next to the other piston) to a fluid pressure supplied from a storage reservoir or a pressure reducing valve supplied from any suitable source; the other side of the same piston being exposed to the pressure existing in the controlling chamber (or pipe), which is governed by a manually operated valve 26, the details of construction of which will be hereinafter described. The other piston (10) is exposed to brake cylinder pressure on the side next to the piston 9 and to atmospheric pressure on the other side. As a result, the brake can be applied and the cylinder pressure maintained by a reduction of pressure in the controlling pipe 20 and controlling or maintenance chamber 2, and in the normal (release) position of the mechanism, both pistons 9 and 10 will be balanced so that there will be no undue wear or friction produced in the preliminary application of the brake.

Assume now, that the pressures in the pipes 17 and 20 are equalized (viz. that the release is full) and that it is desired to put a certain amount of pressure in the brake cylinder 1ª and to maintain that degree of pressure notwithstanding any leakage which might occur from the brake cylinder; this may be accomplished by first reducing the pressure in the pipe 20 to the proper point and then closing this pipe completely. Then the excess of pressure entering the chamber 2 by the duct 16 and pipe 17 will cause an upward movement of the pistons 9 and 10 until the valve 14 is pressed on its seat on the lower end of sleeve 12 by the spring 15, thus closing communication between duct 22 and chamber 13 (that is, closing the exhaust port). The upward movement of the pistons 9—10 will continue (the lower end of the rod 8 leaving the upper end of the stem 11 of valve 14) until the valve 7 permits air entering the chamber 2 by the duct 16, to flow from said chamber, through the chamber 6 in sleeve 5 to the duct 21 and through said duct, to the brake cylinder 1ª, until the pressure in said cylinder (which pressure, by reason of the duct 23, acts upon the upper side of the piston 10) is sufficient to overcome the opposing pressure on the piston 9. The pistons 9 and 10 will then move downwardly until the valve 7 closes and thus prevent further flow of air from the duct 16 to the duct 21, and the stem of the valve 14 opposes the further movement of the pistons because of the spring 15 and the cylinder pressure acting on the valve 14. Now if the pressure in the brake cylinder falls at all, the upward force acting against the piston 9 will overcome the downward force acting on the piston 10 and the valve 7 will again admit air to the duct 21 until the desired pressure is again restored, thus positively maintaining cylinder pressures to any desired point. By reducing the pressure in the pipe 20 and duct 19 to a still lower degree, the cylinder pressure will, of course, be increased. Should it be desired to release the cylinder pressure, it is simply necessary to increase the pressure in the pipe 20 and duct 19, when the valves will be caused to assume the position shown in Fig. 1 of the drawing,—the release being then complete if the pressure in the pipe 20 is fully restored, but only partial if the pressure in the pipe 20 is only partially restored. Assuming that it is only partially restored,—viz. that there is still a difference of pressure acting against the piston 9 tending to force it upward,—when the pressure of the cylinder air acting on the piston 10 is no longer able to hold the valve 7 in the position indicated, said valve will move upwardly until the valve 14 closes and the force exerted by the cylinder pressure acting on it and by the spring 15 no longer aids in this motion,—thus stopping the exhaust and retaining the desired amount of cylinder pressure.

The manually operated controlling valve 26, hereinbefore alluded to, is adapted to be moved to four positions, viz., release, lap, service, and emergency, and it also provides means for securing a higher brake cylinder pressure in "emergency" than "service."

The controlling device 26 comprises a casing 27 having a valve seat 28 provided with a series of ports a, b, c, d, and on the seat 28 a rotary valve 29 is located. A spindle 30 mounted in the top of the casing, engages the valve 29, and to said spindle, an operating lever 31 is secured and provided with means for retaining it in any position to which it may be moved. The casing is provided with a duct 32 which communicates at one end with a pipe 33 connected with the pipe 17 from the main source of fluid pressure supply. The other end of the duct 32 communicates with a duct 34 over the valve 29, and the last-mentioned duct communicates with a passage 35 in the valve, which passage, under certain conditions, is adapted to register with the port *d*. The port *d* communicates, by means of a duct 36 which, in turn, communicates with a pipe 37 connected with the train pipe 20. The port *b* communicates with a chamber 38 and the latter is open through ducts 39 to the atmosphere. The port *c* also communicates with the chamber 38, but is normally closed by a check valve 39$^a$ pressed against its seat by a spring 40. The under face of the valve 29 is made with a cavity 41 which serves to connect certain of the ports. The port *a* communicates with a duct 42, which latter may be connected with a pipe (not shown) leading to a track sanding device, an alarm or other device.

When the parts of the controlling device 26, are in "release" position, as shown in Fig. 1, air will flow from the pipes 17—33, through ducts 32—34, passage 35, port *d* and duct 36 to the pipe 37 and train pipe 20. When the ports are in "lap" position, as shown in Fig. 4, all the ports are closed, thus permitting the operator to hold any amount of pressure that has been attained in the train line pipe and consequently a corresponding degree in the brake cylinder. In "service" position, as shown in Fig. 5, the ports *c* and *d* are connected by cavity 41, thus permitting air to flow from pipe 20 to the atmosphere past the check valve 39$^a$, and through the chamber 38 and ducts 39. The maximum reduction possible in this position is, of course limited, by the check valve 39$^a$ and spring 40, to such a value that the corresponding cylinder pressure obtained will be somewhat less than the maximum amount which it would be possible to obtain from the source of supply through the pipe 17. In "emergency" position, as shown in Fig. 6, the port *d* is connected with ports *b* and *c*, thus permitting of a complete and rapid exhaust of pressure in pipes 37 and 20, with the result that the full pressure carried in the supply pipe 17 will be obtained in the brake cylinder. When the ports are in the position shown in Fig. 6, a port 43 in the valve will admit air to port *a*, which may be piped from the duct 42 to track-sanding devices, or an alarm.

In the modified construction of the valve mechanism shown in Fig. 7, the valve 7 is displaced by a slide valve 44 movable by the rod 8 in a valve chamber 45 which communicates at one end with the chamber 2. The slide valve is adapted (in one position) to connect the port or duct 21$^a$ leading to the brake cylinder with the port 24$^a$ open to the atmosphere. In a different position of the valve 44, fluid will flow from the chamber 45 to the brake cylinder, through a duct 45$^a$ in the valve, or in larger quantity, past the end of said valve when the valve has been moved approximately to the end of its throw. A duct 23$^a$ conducts fluid from the duct 21$^a$ to the chamber 3 at one side of the piston 10, the other side of said chamber being open to the atmosphere by a port 25$^a$. Fluid pressure from the pipe 17 enters the valve chamber 45 at 46 and flows into the chamber 2 at one side of the piston 9, said chamber, at the other side of the piston having communication through ducts 46 and chamber 47 with the train pipe 20 at 48. In this construction, a spring 49 is provided, the resistance of which is added to the train pipe pressure against the movement of the piston 8 during a portion of the throw in one direction of the latter.

In the construction shown in Fig. 8, a spring 50 similar in location and function to the spring 49 shown in Fig. 7, is employed. In Fig. 8, the chambers 2 and 3 and the pistons 9 and 10 are disposed in different planes, and the rods of these pistons are connected so that said pistons will move together, through the medium of a pin 51 movable in a slot 52. A slide valve 53 similar to the valve 44 in Fig. 7 is employed and adapted to connect a chamber 54 with the exhaust duct 55. The chamber 54 is also connected through a duct 56 with the chamber 3 and the latter is provided at the other side of the piston 10 with a vent 57. The chamber 54 also communicates, through the medium of a duct 54$^a$ with the brake cylinder passage. In a different position of valve 53 from that shown in the drawing, the exhaust passage 55 will be closed and air permitted to flow from the valve chamber, through the slot 52, chamber 54 and duct 54$^a$ to the brake cylinder. The main supply pipe 17 is connected at 58 and the train pipe 20 is connected at 59, the same as in the construction shown in Fig. 7.

In the construction shown in Fig. 9, a spring 58 similar in location and function as the springs 49 and 50 in Figs. 7 and 8, is employed, but in the arrangement shown in Fig. 9, the main valve 7$^a$ is similar in location and operation to the main valve 7 shown in Fig. 1. The construction shown in Fig. 9 also differs from that shown in Fig. 1, in that the exhaust is controlled by the piston 10 which passes over ports 59 communicating with the exhaust duct 60.

In addition to its functions in assisting the closing of valve 14, (Fig. 1), the spring 15 serves to add resistance to the movement of the connected pistons, when the valve 7 has closed communication between the chamber 2 and the brake cylinder and before said valve has been fully seated and before the exhaust valve 14 has been opened. Under these conditions, passage of fluid from the brake cylinder will be prevented and a pressure less than the maximum pressure attainable, can be maintained in the brake cylinder. The springs 49, Fig. 7; 50 Fig. 8 and 58 Fig. 9, will serve to prevent admission of air to the brake cylinder. In other words, the spring 15 tends to facilitate admission and prevent exhaust, while the springs 49, 50 and 58, when active, limit admission and facilitate the movement toward the exhaust position.

Having fully described my invention what I claim as new and desire to secure by Letters-Patent, is:—

1. In a valve mechanism, the combination with a casing having two chambers, of pistons in said chambers, means connecting said pistons and causing them to move simultaneously, means for subjecting one of said pistons on one side to pressure from a source of constant supply and on the other side to train pipe pressure, means for subjecting the other piston on one side to brake cylinder pressure and on the other side to a different pressure, a valve controlled by the movements of said connected pistons for controlling the passage of fluid from said source of constant supply to a brake cylinder, and means for controlling brake cylinder exhaust.

2. In a valve mechanism, the combination with a casing having two chambers, of pistons in said chambers, means connecting said pistons and causing them to move simultaneously, means for subjecting one of said pistons on one side to pressure from a source of constant supply and on the other side to train pipe pressure, means for subjecting the other piston on one side to brake cylinder pressure and on the other side to a different pressure, a valve controlled by the movements of said connected pistons for controlling the passage of fluid from said source of constant supply to a brake cylinder, and means controlled by the movement of the connected pistons for opening and closing the brake cylinder exhaust.

3. In a valve mechanism, the combination with a casing having two chambers, of pistons in said chambers, means connecting said pistons and causing them to move simultaneously, means for subjecting one of said pistons on one side to pressure from a source of constant supply and on the other side to train pipe pressure, means for subjecting the other piston on one side to brake cylinder pressure and on the other side to a different pressure, a valve controlled by the movements of said connected pistons for controlling the passage of fluid from said source of constant supply to a brake cylinder, a brake cylinder exhaust duct, and a valve operative by the movements of the connected pistons to open and close said duct.

4. In a valve mechanism, the combination with a casing having two chambers, of pistons in said chambers, means connecting said pistons and causing them to move simultaneously, means for subjecting one of said pistons on one side to pressure from a source of constant supply and on the other side to train pipe pressure, means for subjecting the other piston on one side to brake cylinder pressure and on the other side to a different pressure, a valve controlled by the movements of said connected pistons for controlling the passage of supply fluid to a brake cylinder, an exhaust valve, means for subjecting said exhaust valve to brake cylinder pressure, a spring tending to close said exhaust valve, and means coöperating with the connected piston for opening said exhaust valve.

5. The combination with a casing having two separated chambers, of pistons in said chambers, means connecting said pistons and causing them to move simultaneously, a fluid pressure supply from a maintained source and a train pipe communicating with one of said chambers at respective sides of the piston therein, a valve movable by said pistons to control the passage of fluid from said source of constant supply to a brake cylinder, means for subjecting the other piston on one side to brake cylinder pressure and on the other side to a different pressure, means for controlling brake cylinder exhaust, and a manually operated valve device for controlling fluid in the train pipe.

6. In a valve mechanism, the combination with a casing having two chambers, of pistons in said chambers, means connecting said pistons and causing them to move simultaneously, means for subjecting one of said pistons on one side to pressure from a source of constant supply and on the other side to train pipe pressure, means for subjecting the other piston on one side to brake cylinder pressure and on the other side to a different pressure, a valve controlled by the movements of the connected pistons for controlling the passage of fluid from said source of constant supply to the brake cylinder, means for controlling the brake cylinder exhaust, and means for varying the resistance to the movement of the connected pistons, whereby the passage of fluid to and from the brake cylinder can be prevented.

7. In a valve mechanism, the combination of a casing having two separated chambers, a piston in each of said chambers, connections between said pistons causing them to move simultaneously, a valve operated by said connections, means for admitting fluid from a source of constant supply to one of said chambers at one side of the piston therein, means for admitting train pipe fluid to the same chamber at the other side of the piston, means controlled by said valve for controlling passage of fluid from said source of constant supply to a brake cylinder, means for admitting fluid of different pressures to the other chamber at respective sides of the piston thereon and means for exhausting brake cylinder fluid.

8. In a valve mechanism, the combination with a casing having two separated chambers, of pistons in said chambers, connecting means between said pistons, a fluid supply duct and a train pipe duct communicating with one of said chambers at respective sides of the piston therein, means for conducting fluid from a source of constant supply to said fluid supply duct, a brake cylinder duct, a valve controlled by the movements of said pistons for controlling the passage of fluid from said source of constant supply to the brake cylinder duct, a brake cylinder exhaust duct, and means for subjecting the piston in the other chamber to brake cylinder pressure on one side of said piston and means for subjecting said piston on its other side to a different pressure.

In testimony whereof, I have signed this specification in the presence of two subscribing witnesses.

HOWARD M. P. MURPHY.

Witnesses:
R. S. FERGUSON,
A. W. BRIGHT.